United States Patent
Volk

(10) Patent No.: US 7,568,127 B2
(45) Date of Patent: Jul. 28, 2009

(54) SIGNAL DRIVE DE-EMPHASIS CONTROL FOR SERIAL BUS

(75) Inventor: Andrew M. Volk, Granite Bay, CA (US)

(73) Assignee: Intel Corporation, Santa Clara, CA (US)

( * ) Notice: Subject to any disclaimer, the term of this patent is extended or adjusted under 35 U.S.C. 154(b) by 1128 days.

(21) Appl. No.: 11/018,143

(22) Filed: Dec. 20, 2004

(65) Prior Publication Data

US 2006/0179372 A1   Aug. 10, 2006

(51) Int. Cl.
*G06F 11/00* (2006.01)

(52) U.S. Cl. .............................. 714/32; 710/16; 710/17; 702/64; 375/287

(58) Field of Classification Search ........................ None
See application file for complete search history.

(56) References Cited

U.S. PATENT DOCUMENTS 5,933,459 A * 8/1999 Saunders et al. ............ 375/317
6,952,654 B2 * 10/2005 Park et al. .................... 702/64
7,072,995 B1 * 7/2006 Burroughs .................... 710/16
7,111,181 B2 * 9/2006 Bell ............................. 713/300
7,392,147 B2 * 6/2008 Lo et al. ...................... 702/122
7,447,485 B2 * 11/2008 Ishikawa et al. .......... 455/127.1
7,464,195 B2 * 12/2008 Bland et al. ................... 710/15
2002/0005840 A1 * 1/2002 Wicker ......................... 345/204

* cited by examiner

*Primary Examiner*—Christopher S McCarthy
(74) *Attorney, Agent, or Firm*—Grossman, Tucker, Perreault & Pfleger, PLLC

(57) ABSTRACT

Transmitting a transition between high and low states across a lengthy conductor with a main transmitter to transmit data, providing emphasis with an emphasis transmitter to strengthen the transmission of the transition, transmitting a low-to-high transition to test for the absence of an electronic device coupled to the lengthy conductor, and detecting an occurrence of an overvoltage level indicating the absence of such an electronic device.

20 Claims, 12 Drawing Sheets

SIGNAL DRIVE DE-EMPHASIS CONTROL FOR SERIAL BUS

BACKGROUND

In efforts to achieve ever greater performance in interactions between different electronic devices connected by lengthy conductors made up of printed circuit board (PCB) traces and/or cable wires, such as computer systems and peripheral devices (e.g., printers, scanners, cameras, disk drives, etc.), the rates at which commands and/or data are transferred between such electronics systems through such lengthy conductors have continued to be increased. It is typical for such external cables to be of considerable length to suit the convenience of users of such electronic devices by allowing such users the flexibility to place such electronic devices some distance apart from each other. Indeed, a length of approximately six feet or two meters has become quite commonplace for such external cables. It is also typical for electronic devices to have connectors positioned on the exterior of electronic devices at locations about the exterior of such electronic devices to suit either the convenience or aesthetic concerns of users, and this often results in the use of lengthy PCB traces to couple those connectors to the necessary circuitry within those electronic devices. However, such lengthy cable wires and/or PCB traces present lengthy conductors that increase capacitance levels and frequency-dependent signal loss, thereby slowing down the rate at which changes in voltage levels that are meant to signal changes in binary values are able to propagate from one end of such lengthy conductors to the other. In earlier years, with slower data transfer rates, this slower rate of signal propagation could be largely ignored, since there was plenty of time available for such propagation to occur such that the entire conductor would achieve the new desired voltage level with plenty of time to spare before the new voltage level would be read by a device receiving that signal.

However, in the current day, data transfer rates have already become high enough that the amounts of time required for such propagations of changes in signals across such a lengthy conductor have now become significant quantities of time that can no longer be ignored and must, therefore, be reduced to allow data transfer rates to increase further. Various techniques have already been tried in an effort to address this issue, including the use of lower voltage swings (i.e., decreasing the difference between voltage levels of high and low states) and differential signaling. Unfortunately, the need for the voltage level of the high state to be distinguishable from the voltage level of the low state by receiving circuitry limits the degree to which the difference between those two voltage levels may be reduced.

Therefore, there continues to be a need for a way to transfer data between electronic devices connected through lengthy conductors that further counteracts the delays in the propagation of changes in signals induced by the added signal loss arising from such conductor lengths.

BRIEF DESCRIPTION OF THE DRAWINGS

The objects, features, and advantages of the present invention will be apparent to one skilled in the art in view of the following detailed description in which:

FIGS. 1b, 1c, 1d and 1e are timing diagrams of the selective use of emphasis and de-emphasis by embodiments discussed with reference to what is depicted in FIG. 1a.

FIGS. 2b and 2c are timing diagrams of the detection of the absence of a connection to an electronic device by embodiments discussed with reference to what is depicted in FIG. 2a.

DETAILED DESCRIPTION

In the following description, for purposes of explanation, numerous details are set forth in order to provide a thorough understanding of embodiments of the present invention. However, it will be apparent to one skilled in the art that these specific details are not required in order to practice the present invention as hereinafter claimed.

Embodiments of the present invention concern incorporating support for the timed use of signal emphasis and de-emphasis in the transmission of data between two electronic devices across a lengthy conductor so as to boost the transmission of a signal immediately following a change between high and low states to enable more accurate reception of high and low voltage levels indicating high and low states while also avoiding driving the voltage level seen on that conductor at the location of a receiver to a higher or lower level than is desirable. Although at least part of the following discussion centers on the driving of digital signals across a lengthy conductor employed in the serial transmission of commands and/or data between a computer system and a peripheral device, it will be understood that embodiments of the claimed invention may be practiced in support of a number of different types of electronic devices employing the transmission of any of a number of types of digital signals for any of a number of purposes.

Figure 1A:
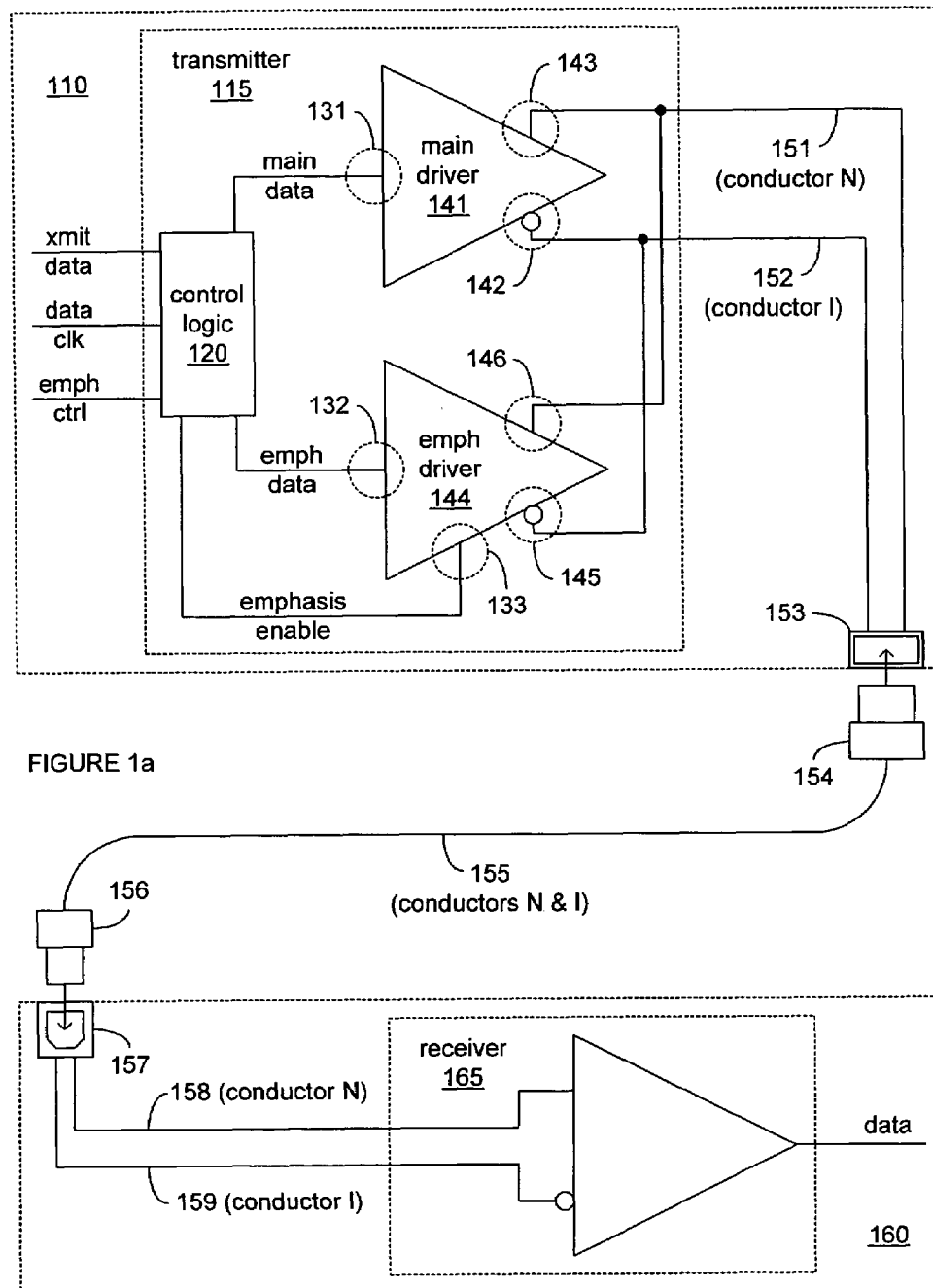
FIG. 1a is a block diagram of embodiments capable of providing timed emphasis and de-emphasis in digital signal transmissions.

FIG. 1a is a block diagram of embodiments employing timed emphasis and de-emphasis in digital signal transmissions. In some embodiments, electronic device 110 is a computer system transmitting commands to electronic device 160, which is a peripheral device to be operated under the control of electronic device 110 (i.e., electronic device 160 may be a computer-controllable peripheral device, such as a printer, scanner, modem, camera, digital audio device, etc.). Electronic device 110 is made up, at least in part, of transmitter 115 and PCB traces 151 and 152 coupling transmitter 115 to cable 155 by which electronic device 110 transmits binary information to electronic device 160, which is made up, at least in part, of receiver 165 and PCB traces 158 and 159 coupling receiver 165 to cable 155. Within cable 155 is at least a pair of wires, one of which is coupled to PCB traces 151 and 158, that together, form one lengthy conductor (hereinafter referred to as "conductor N"), and another of which is coupled to PCB traces 152 and 159, that together, form another lengthy conductor (hereinafter referred to as "conductor I"). In some embodiments, receiver 165 may incorporate terminating elements at its inputs that are coupled to PCB traces 158 and 159 with resistive values substantially equal to the impedance characteristics of cable 155 and/or PCB traces 151, 152, 158 and 159. Similarly, in some embodiments, transmitter 115 may incorporate similar terminating elements at outputs that are coupled to PCB traces 151 and 152.

In some embodiments, electronic device 110 may be further made up of cable connector 153, and electronic device 160 may be further made up of cable connector 157, thereby permitting cable 155 to be selectively attached or detached to electronic devices 110 and/or 160 through mating cable connectors 154 and 156, respectively, that make up part of cable 155. As depicted in FIG. 1a, the digital transfers are carried out employing a single differential pair of signal lines implementing a serial form of digital communication. In alternate embodiments, single-ended signaling may be used, a multitude of conductors may be used to implement a parallel form of digital communication, and/or a multitude of conductors may be used to implement multiple side-by-side pathways of digital serial communications. Also, although FIG. 1a depicts a configuration of transmitter and receiver providing only for unidirectional transmission from electronic device 110 to electronic device 160, those skilled in the art will readily recognize that bidirectional configurations such that signals may be transmitted in either direction between electronic devices 110 and 160 across the same conductors are also possible in various embodiments. Among such embodiments, may be embodiments designed to employ timings, signal characteristics and/or various protocols meant to conform with any of a number of widely known and used standards for digital communications between electronic devices, with one possibility being embodiments meant to conform to one or more revisions of the Universal Serial Bus as described in the series of USB specifications maintained by the USB Implementers Forum, Inc., a non-profit corporation based in Portland, Oreg.

Transmitter 115 is also made up, at least in part, of control logic 120, main driver 141 and emphasis driver 144. Control logic 120 is coupled to another portion of transmitting device 110 from which the data to be transmitted (labeled as "xmit data") is received as timed by a data clock signal also received from another portion of transmitting device 110. Main driver 141 is a differential driver that receives the main data provided to it by control logic 120 at input 131 and re-drives the main data both in non-inverted form through output 143 and in inverted form through output 142. Outputs 143 and 142 are coupled to PCB traces 151 and 152, respectively, which convey the re-driven output from outputs 143 and 142 to cable 155 to be further conveyed to receiving device 160, possibly through cable connectors 153 and 154 in embodiments in which cable 155 is meant to be detachable from transmitting device 110. Control logic 120 is further coupled to another portion of transmitting device 110 to receive at least one emphasis control signal. Control logic 120 is coupled and supplies emphasis data to input 132 of emphasis driver 144. In a manner similar to main driver 141, emphasis driver 144 is a differential driver that receives emphasis data at input 132 and re-drives the emphasis data both in non-inverted form through output 146 and in inverted form through output 145. Outputs 146 and 145 are also coupled to PCB traces 151 and 152, respectively. However, emphasis driver 144 is either configured or designed to drive its outputs at a fraction of the power (i.e., with a fraction of the current flow) that is employed by main driver 141 in driving outputs 143 and 142. Specifically, in some embodiments, emphasis driver 144 is either configured or designed to drive its outputs with 10% (or thereabouts) of the current flow with which main driver 141 drives outputs 143 and 142. As will be discussed in greater detail, emphasis driver 144, operating under the control of control logic 120, may be used to add to the current with which main driver 141 drives conductors N and I of which PCB traces 151 and 152, respectively, are a part (an action that is called "emphasis"), and/or may be used to subtract from the amount of current with which main driver 141 drives conductors N and I (an action that is called "de-emphasis").

In various possible embodiments, control logic 120 may be designed and/or configurable to selectively enable the use of a timed combination of emphasis and de-emphasis, to select the duration of the emphasis (followed by de-emphasis) to be either a chosen fraction of a cycle of the data clock (e.g., half a clock cycle) or a full clock cycle, and/or to continuously employ emphasis. Correspondingly, the emphasis control signal(s) received from other portions of transmitting device 110 may be an emphasis and de-emphasis enable/disable signal, a fraction/full clock cycle selection signal (perhaps a half/full clock cycle signal), and/or a continuous emphasis enable/disable signal (what might be called an emphasis "jam" signal in which emphasis is "jammed" at a continuously enabled setting). Where control logic 120 is designed and/or configurable to allow the use of a timed combination of emphasis and de-emphasis to be enabled or disabled, control logic 120 may be further coupled to driver enable input 133 of emphasis driver 144 through an driver enable signal line to selectively enable or disable the driving of emphasis data onto the two lengthy conductors through outputs 146 and 145, respectively, of emphasis driver 144. Also, although a single emphasis driver (i.e., emphasis driver 144) is depicted, some embodiments may employ two or more emphasis drivers in parallel, either enabling a degree of control over the strength of the emphasis and/or de-emphasis provided, or providing a way by which the length of the duration of emphasis may be varied to a greater degree through the provision of different pieces of emphasis circuitry that change from providing emphasis to de-emphasis after different predetermined durations of the time during which emphasis is provided.

Although the description of connections between electronic devices 110 and 160 has centered on there being a combination of PCB traces and wires within a cable making up conductors N and I, those skilled in the art will readily recognize that other forms of lengthy conductors may be implemented in various other possible embodiments, including PCB traces without an interposing cable where, for example, two printed circuit boards are directly coupled together via connectors 153 and 157. Also, although the depiction and discussion of connections within transmitter 115 has presented the outputs of main driver 141 and emphasis driver 144 as being coupled via PCB traces, those skilled in the art will readily recognize, especially in the case where integrated circuits are employed, that the outputs of main driver 141 and emphasis driver 144 may be coupled within an integrated circuit with these combined driver outputs then being coupled to PCB traces.

FIGS. 1b, 1c, 1d and 1e are timing diagrams of the selective use of emphasis and de-emphasis by the embodiments discussed with reference to what is depicted in FIG. 1a, each depicting the results of differing ways of using or not using emphasis and/or de-emphasis in the transmission of digital signals across conductors N and I. The data clock received by control logic 120 is depicted, as well as the main data received by main driver 141 and the emphasis data received by emphasis driver 144 (except in FIG. 1b where no emphasis or de-emphasis is used), along with the resulting signals that may be observed on PCB trace 151 in close proximity to the outputs of main driver 141 and emphasis driver 144, and on PCB trace 158 in close proximity to receiver 165. It should be noted that for the sake of clarity and simplicity of discussion, signals that may be observed on conductor N coupled to the non-inverting outputs of main driver 141 and emphasis driver 144

(i.e., outputs 143 and 146) are depicted, but not signals that may be observed on conductor I coupled to their inverting outputs (i.e., outputs 142 and 145), since those signals would be largely an opposing mirror image, at least the majority of the time, given that main driver 141 and emphasis driver 144 are differential drivers. It should also be noted that to facilitate ease of comparison of results between differing ways in which emphasis and/or de-emphasis is employed or not employed, FIGS. 1b, 1c, 1d and 1e depict the same signals (with the exception that FIG. 1b does not depict emphasis data), as well as the same pattern of transitions on the main data signal at the same time points.

Figure 1B:
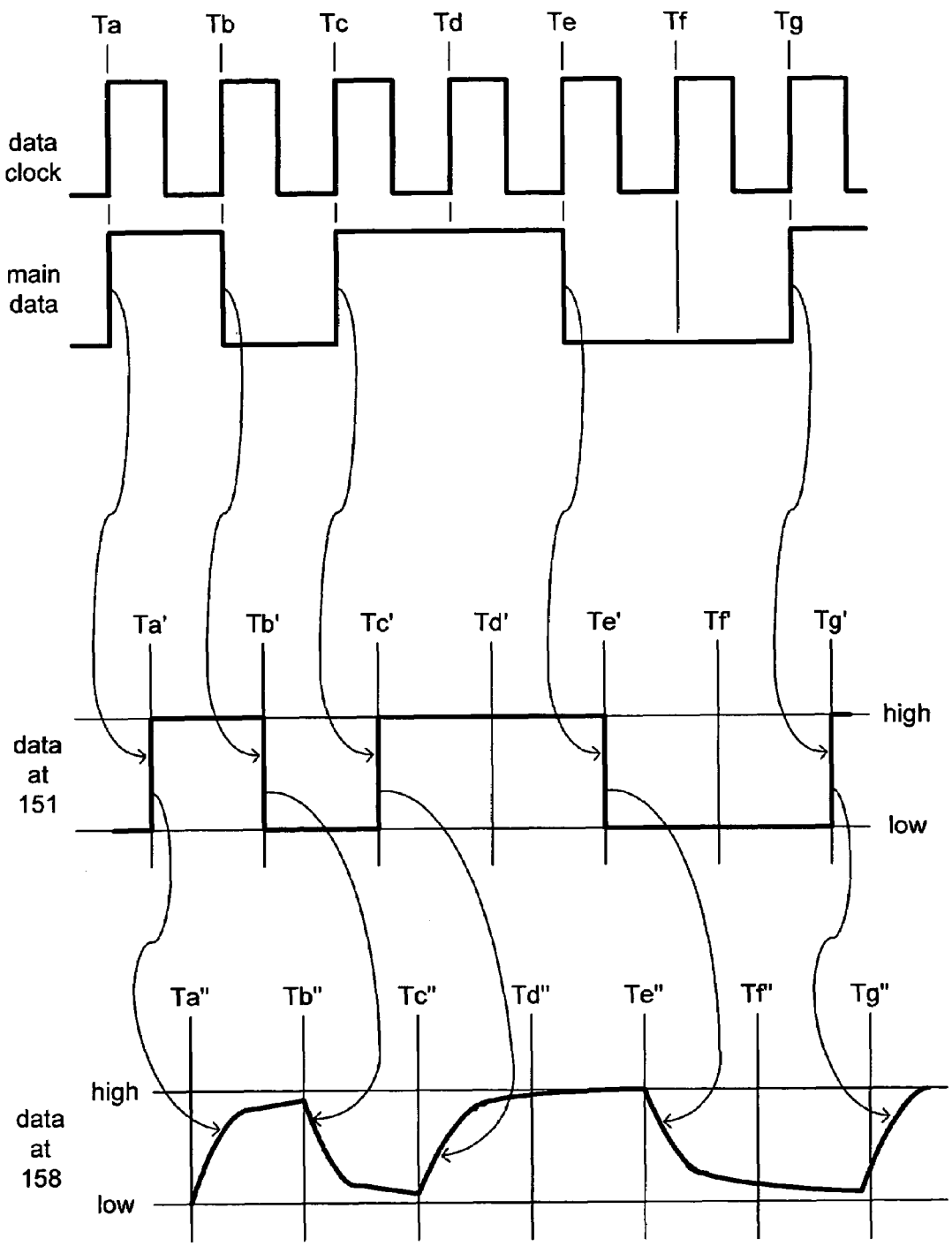

FIG. 1b depicts results that may be seen where the use of either emphasis or de-emphasis is disabled such that only main driver 141 drives high and low signals onto PCB traces 151 and 152, and control logic 120 is configured to cause emphasis driver 144 to refrain from driving either PCB traces 151 or 152. In other words, emphasis driver 144 is not used, at all, and so emphasis data is not depicted in FIG. 1b. At time point Ta, at a low-to-high transition of the data clock which signals the beginning of a clock cycle, the main data signal received at input 131 of main driver 141 transitions from a low state to a high state. This low-to-high transition at Ta is re-driven by main driver 141 onto PCB trace 151, producing the low-to-high transition at a close proximity to main driver 141 depicted at time point Ta', which is shifted in time from time point Ta as a result of the delay inherent in signals propagating through main driver 141. A corresponding low-to-high transition also occurs on PCB trace 158 in close proximity to receiver 165 at time point Ta", which is shifted in time from time point Ta' as a result of the delay inherent in signals propagating through the length of conductor N (i.e., from PCB trace 151 proximate to main driver 141 at one end of conductor N, to PCB trace 158 proximate to receiver 165 at the other end of conductor N). A similar sequence of events occurs when at time point Th, the main data transitions from a high state to a low state, and corresponding high-to-low transitions occur on PCB trace 151 proximate to main driver 141 at time point Tm and PCB trace 158 proximate to receiver 165 at time point Th". In both of these sets of low-to-high and high-to-low transitions, it can be seen that there is a difference in signal quality between the signals observed at each end of conductor N. This difference in signal quality depicts the effect of the signal loss across the length of conductor N and the lack of any use of either emphasis or de-emphasis, such that relatively clean low-to-high and high-to-low transitions with very short transition times occur on PCB trace 151 proximate to main driver 141, while slower and less well-defined low-to-high and high-to-low transitions occur on PCB trace 158 proximate to receiver 165. These less well-defined transitions result in receiver 165 encountering reduced drive levels at the inputs of receiver 165 for some time after the occurrence of each transition, thereby potentially making the reception of the transmitted data less reliable. If emphasis driver 144 had been employed to provide emphasis to add to the current used by main driver 141 to drive the low-to-high and the high-to-low transitions, the result as observed on PCB trace 158 would have been faster low-to-high and high-to-low transitions.

At time point Tc, another low-to-high transition of main data occurs at input 131 of main driver 141, and as was the case with the low-to-high transition at time point Ta, there are corresponding low-to-high transitions at corresponding time points Tc' and Tc" on PCB traces 151 and 158, respectively. However, unlike the low-to-high transition at time point Ta, which was followed by a high-to-low transition after only one full cycle of data clock at time point Th, the low-to-high transition at time point Tc is followed with the continued driving of the high state through time point Td for a second full clock cycle of data clock with a high-to-low transition not occurring until time point Te. Though the extended length of this high state after the low-to-high transition at time point Tc results in a relatively clean signal on PCB trace 151 proximate to main driver 141 with the high state being quickly achieved during the corresponding low-to-high transition at time point Tc' and a relatively level high state maintained at or close to the desired high voltage level, the signal observed on PCB trace 158 proximate to receiver 165 shows an undesirable effect of the combination of large signal loss introduced by the length of conductor N and the continued driving of the high state for two full cycles of data clock from output 143 of main driver 141 without the benefit of either emphasis or de-emphasis. After a slower low-to-high transition at Tc", similar to that which occurred at Ta", the voltage level of observed on PCB trace 158 proximate to receiver 165 continues rising and does reach the desired high level, but requires considerable time to do so, taking two full clock cycles (through time point Td") to time point Te" where the effect of the high-to-low transition of main data at time point Te begins. Given the comparatively sluggish response demonstrated on PCB trace 158, the fact that the voltage level from the low-to-high transition begun at Tc" actually does reach the desired high voltage level can ironically be undesirable, since one result is that an ever greater amount of time will be needed for the voltage in the high-to-low transition that begins at time point Te" to actually fall all the way down to the desired low voltage. However, as demonstrated by the low-to-high transition that follows at Tg", even two full clock cycles of time may not be enough to for the voltage level to fully transition to the desired low state before the next low-to-high transition occurs.

Figure 1C:
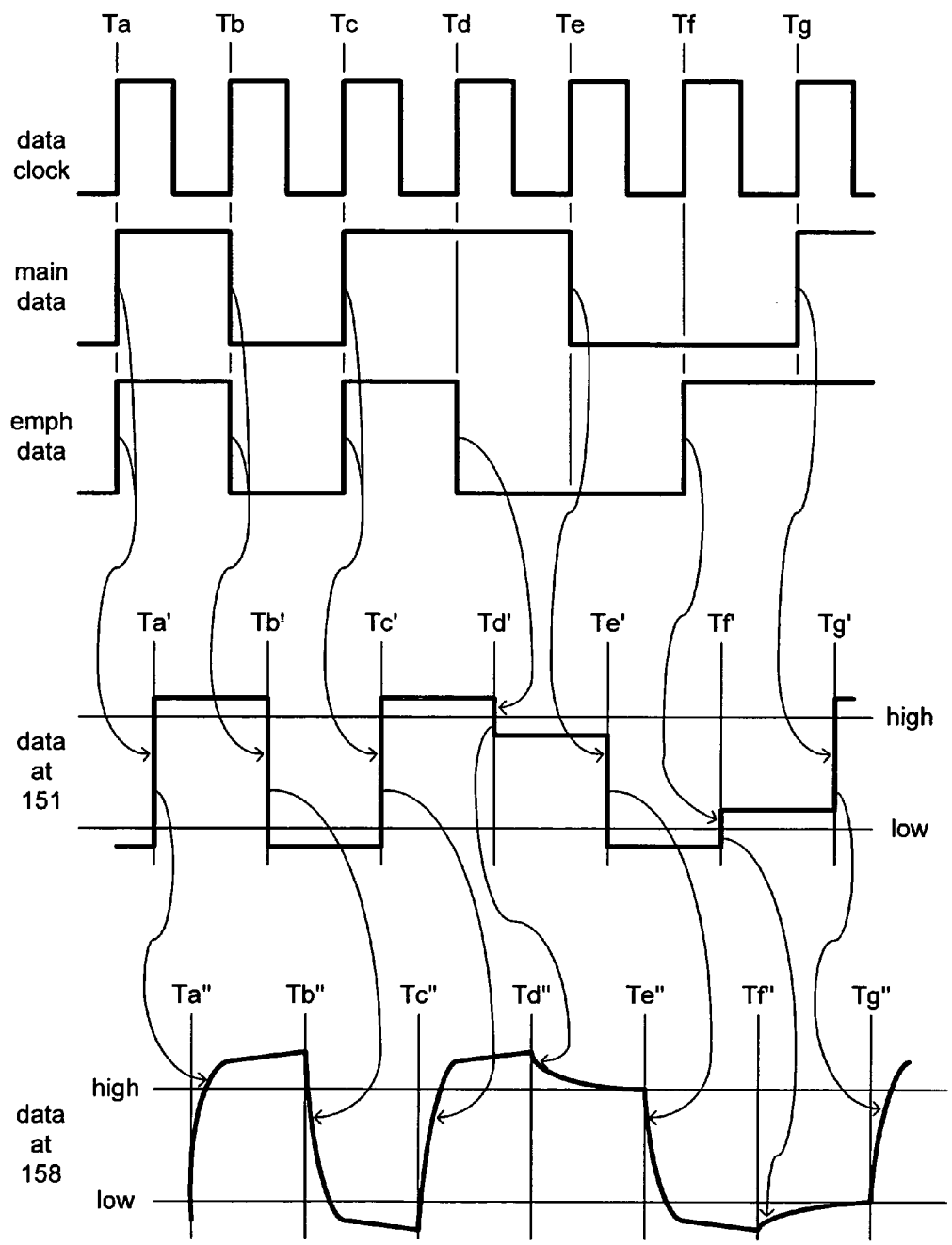

FIG. 1c depicts the results that may be seen where a timed combination of emphasis and de-emphasis is enabled such that control logic 120 supplements the current with which main driver 141 drives each transition with emphasis driver 144 to provide emphasis, then switching to providing de-emphasis such that emphasis driver 144 subtracts from the current with which main driver 141 continues driving a high or low state if that high or low state continues for longer than a single cycle of data clock. At time point Ta, main driver 141 receives the low-to-high transition of main data at input 131. Main driver 141 re-drives this low-to-high transition onto PCB trace 151, and given that a transition has occurred in the main data signal, control logic 120 passes on the same low-to-high transition as emphasis data to input 132 of emphasis driver 144 to also re-drive onto PCB trace 151 in tandem with main driver 141, thereby adding to the strength with which this low-to-high transition is being re-driven by main driver 141 (i.e., providing "emphasis" to this low-to-high transition) such that the low-to-high transition that occurs on PCB trace 151 at time point Ta' is relatively quick and the high voltage level that is reached is above the high voltage level that would be reached if such emphasis were not provided. This speedy low-to-high transition on PCB trace 151 at time point Ta' is followed by a low-to-high transition at time point Ta" on PCB trace 158 (i.e., at the other end of conductor N) that also occurs more quickly and reaches a higher voltage level than would have occurred were emphasis not provided. These speedier transitions result in receiver 165 encountering better signal strength, thereby making the reception of the transmitted data more reliable. A similar sequence of events occurs when at time point Th, a high-to-low transition occurs in main data. Main driver 141 re-drives the high-to-low transition onto PCB trace 151, and given that another transition has occurred in the main data signal, control logic 120 passes on the same high-to-low transition as emphasis data to emphasis driver 144 to provide emphasis for the high-to-low transition by adding to the strength with which main driver 141 is re-driving it. As was the case with the low-to-high transitions at time points Ta' and Ta" observed at PCB traces 151 and 158, respectively, the high-to-low transitions at time points Th' and Th" occur more quickly than would be the case if emphasis were not used. Also, the low voltage levels achieved on PCB traces 151 and 158 as a result of these high-to-low transitions are both lower than would have been reached had emphasis not been provided.

At time point Tc, another low-to-high transition of main data occurs, and main driver 141, control-logic 120 and emphasis driver 144 respond to this low-to-high transition in a manner identical to how the low-to-high transition at time point Ta was responded to. As a result, the characteristics of the low-to-high transitions at time points Tc' and Tc" on PCB traces 151 and 158 are substantially identical to those of the low-to-high transitions at time points Ta' and Ta", respectively. However, as previously mentioned, control logic 120 is to cause emphasis to occur starting on each occurrence of a transition for a duration of only one full cycle of data clock, and so, if there is not another transition at the start of the next full cycle of data clock, control logic 120 is to cause de-emphasis to occur until the next transition takes place. As a result, the emphasis provided in driving a high voltage that control logic 120 causes emphasis driver 144 to provide starting at the occurrence of the low-to-high transition at time point Tc continues only until time point Td, where control logic 120 changes the emphasis data transmitted to input 132 of emphasis driver 144 to be the opposite state of the main data received at input 131 of main driver 141, such that emphasis driver 144 now attempts to drive the opposite voltage level onto PCB trace 151 that main driver 141 is still driving (i.e., emphasis driver 144 now provides de-emphasis of the voltage level that main driver 141 is driving). Given that emphasis driver 144 drives PCB trace 151 with a strength that is a fraction of the strength with which main driver 141 drives PCB trace 151, the result of emphasis driver 144 driving an opposing voltage level to main driver 141 is a reduction in the voltage level observed on PCB trace 151 starting at time point Td', which is then followed by at least a cessation in the climbing of the voltage level on PCB trace 158 at time point Td", and possibly, a slight reduction in voltage level, there. A similar sequence of events occurs in response to the high-to-low transition of the main data signal at time point Te. Again, since this is a transition, control 120 logic causes emphasis driver 144 to drive a low voltage level onto PCB trace 151 in tandem with main driver 141, thereby causing a speedier high-to-low transition at time point Te'. When a full cycle of data clock has occurred, and there is no new transition of main data at time point Tf, control logic 120 changes the emphasis data supplied to emphasis driver 144 such that emphasis driver 144 then attempts to drive an opposing voltage level onto PCB trace 151, thereby causing a slight rise in the low voltage level being driven by main driver 141 starting at time point Tf', and reflected on PCB trace 158 at time point Tf' as at least a cessation of a continuing drop in voltage level, and perhaps, a slight rise in the voltage level.

Figure 1D:
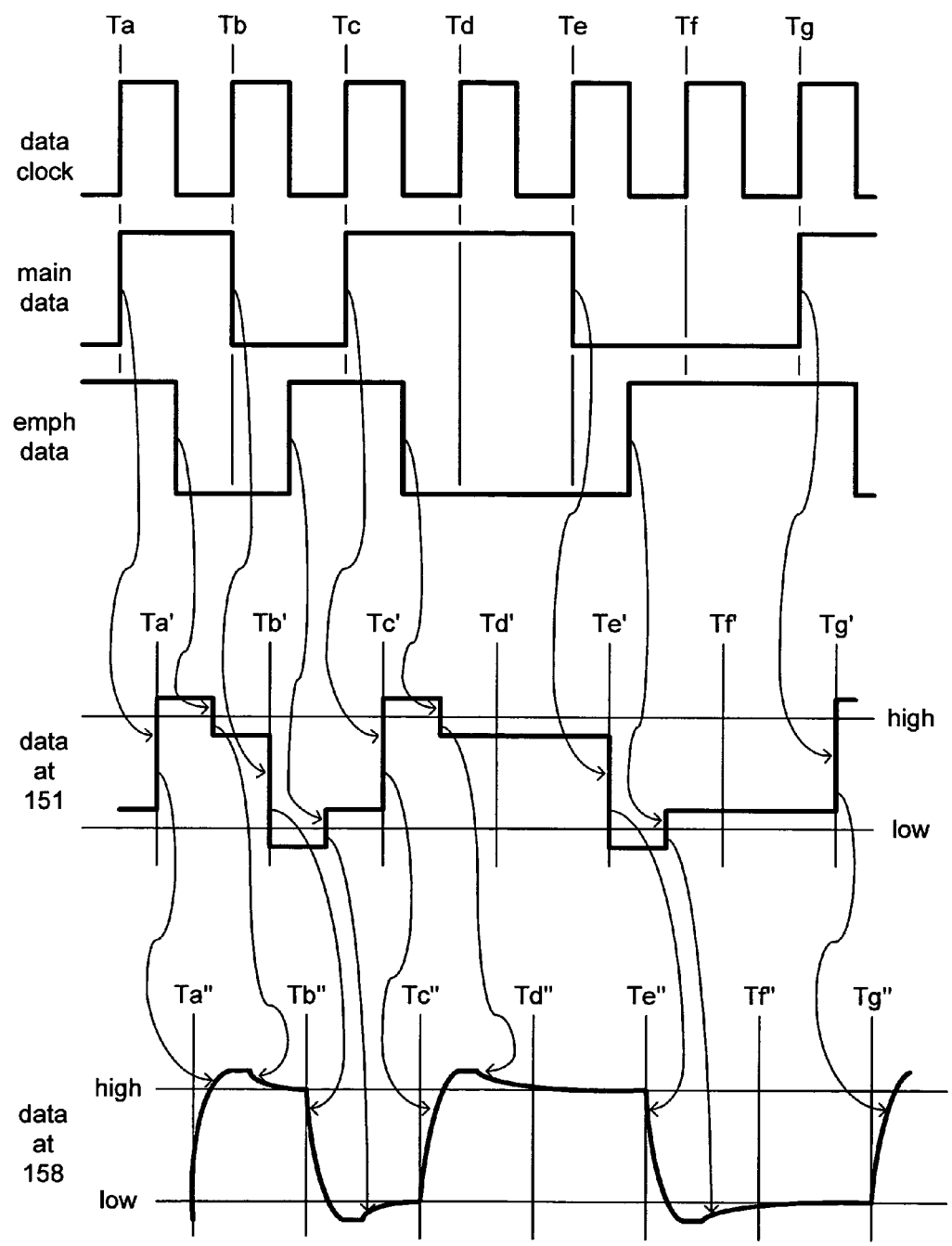

FIG. 1*d* depicts the results that may be seen where a timed combination of emphasis and de-emphasis is enabled such that emphasis driver 144 supplements the current with which main driver 141 drives each transition with emphasis driver 144 to provide emphasis, and then switches to providing de-emphasis starting half a cycle of data clock after each transition. However, as previously alluded to, in various possible embodiments, the fraction of the cycle of the clock at which emphasis is ended and de-emphasis is begun may be different than a half cycle. At time point Ta, main driver 141 and emphasis control 120 both receive the low-to-high transition of main data at inputs 131 and 121, respectively. Main driver 141 re-drives this low-to-high transition onto PCB trace 151, and given that a transition has occurred in the main data signal, control logic simply continues to cause emphasis driver 144 to continue to drive a high voltage level onto PCB trace 151 resulting in emphasis driver 144 providing emphasis to the driving of PCB trace 151 to a high voltage level by main driver 141. As a result of this provision of emphasis to driving PCB trace 151 high, the low-to-high transition that occurs on PCB trace 151 at time point Ta' is relatively quick and the high voltage level that is reached is above the high voltage level that would be reached if such emphasis were not provided. This speedy low-to-high transition at time point Ta' is reflected in a low-to-high transition at time point Ta" on PCB trace 158 (i.e., at the other end of conductor N proximate to receiver 165) that also occurs more quickly and reaches a higher voltage level than would have occurred were emphasis not provided. However, at a time only half a cycle of data clock after Ta (i.e., midway between Ta and Th), control logic 120 alters the emphasis data supplied to emphasis driver 144 to cause emphasis driver 144 to start providing de-emphasis of the high voltage level being driven onto PCB 151 trace by main driver 141 (i.e., to subtract from the strength with which main driver 141 drives a high voltage onto PCB trace 151). This switch to causing emphasis driver 144 to provide de-emphasis after half a data clock cycle is reflected midway between time points Ta' and Tm' where a slight reduction in the voltage level on PCB trace 151 occurs, and midway between time points Ta" and Th", where at least a cessation in an otherwise continuing rise in voltage level is caused to occur, and perhaps, a reduction in the voltage level that aids in bringing the voltage level somewhat closer to the desired high voltage level for reading by receiver 165 at the other end of conductor N. In some embodiments, this provision of emphasis at the start of a signal transition followed by de-emphasis at half a clock cycle, later, can result in the substantially correct compensation for signal level losses caused by the considerable length of conductor N without also substantially overdriving the input of receiver 165 coupled to conductor N. A similar sequence of events occurs when at time point Th, a high-to-low transition occurs in main data. Main driver 141 re-drives the high-to-low transition onto PCB trace 151, and control logic 120 causes emphasis driver to continue driving a low voltage level onto PCB trace 151, thereby providing emphasis to the high-to-low transition driven onto PCB trace 151 by main driver 144. As was the case with the low-to-high transitions at time points Ta' and Ta" observed on PCB traces 151 and 158, respectively, the high-to-low transitions at time point Tm' and Th" occur more quickly than would be the case if emphasis were not used, and the low voltage levels achieved on PCB traces 151 and 158 as a result of these high-to-low transitions are both lower than would have been reached had emphasis not been used. Also, as was the case with the low-to-high transition of the main data signal, control logic 120 causes emphasis driver 144 to switch to providing de-emphasis starting just half a cycle of data clock after time point Th, such that a slight rising of the voltage level on PCB trace 151 occurs midway between time points Tm' and Tc', and such that at least a cessation of the otherwise continuing lowering of the voltage level on PCB trace 158 occurs midway between time points Th" and Tc", and possibly a slight rise in the voltage level observed on PCB trace 158 that brings that voltage level closer to the desired voltage level for a low state to be read by receiver 165, again, without substantial overdriving.

At time point Tc, another low-to-high transition of main data occurs, and main driver 141, control logic 120 and emphasis driver 144 respond to this low-to-high transition in a manner substantially identical to how the low-to-high transition at time point Ta was responded to. As a result, the characteristics of the low-to-high transitions at time points Tc' and Tc" on PCB traces 151 and 158 are substantially identical to those of the low-to-high transitions at time points Ta' and Ta", respectively, followed by a switch to providing de-emphasis after half a cycle of data clock that causes a reduction in voltage on PCB trace 151 midway between time points Tc' and Td' and at least a cessation in the rising of the voltage level on PCB trace 158 midway between time points Tc" and Td". Since no transition in main data occurs at time point Te, main driver 141 continues to drive a high voltage level onto PCB trace 151, and control logic 120 continues to cause emphasis driver 144 to continue to provide de-emphasis, with the result that the voltage levels on PCB traces 151 and 158 remain substantially unchanged. A similar sequence of events occurs in response to the high-to-low transition of the main data signal at time point Te. Again, the low voltage level driven by main driver 141 onto PCB trace 151 is given emphasis such that the high-to-low transitions on PCB traces 151 and 158 at time points Te' and Te", respectively, occur more quickly. These quicker transitions are then followed by the onset of de-emphasis at half a cycle of the data clock later causing a slight increase in the voltage level to occur on PCB trace 151 midway between time points Te' and Tf', and at least a cessation in the continuing lowering of the voltage level on PCB trace 158 midway between time points Te" and Tf". Given the lack of transition in main data at time point Tf, main driver 141 continues driving a low voltage level onto PCB trace 151, and emphasis driver 144 continues to provide de-emphasis.

Although FIG. 1d shows the de-emphasis timing as midway between data clock edges, those skilled in the art will readily recognize that any suitable delay between the main data clock and the timing of the emphasis data may be used to control the pre-emphasis and the amount that the data signal at PCB trace 158 exceeds (or overshoots) the steady-state de-emphasis level. Further, those skilled in the art will readily recognize that additional emphasis drivers (such as emphasis driver 144) timed with different delays from the main data clock and with different drive levels can be used to further tune the waveshape that results on PCB trace 151 such that the signal that results on PCB trace 158 has a fast transition time with minimal overshoot of the steady-state de-emphasized level. The degree high and low voltage levels achieved at PCB trace 158 may be controlled by controlling the period of time from when emphasis begins to be provided to when emphasis is ended and de-emphasis begins to be provided, as well as by controlling the strength with which emphasis driver 144 provides emphasis and/or de-emphasis. Also, the high and low voltage levels achieved at PCB trace 158 may be controlled through the use of multiple emphasis drivers that each employ differing drive strengths and/or differing timings such that one emphasis driver may begin providing emphasis and/or begin providing de-emphasis at different times relative to each other to provide potentially greater control over the timing and waveshape that results on PCB trace 151.

Figure 1E:
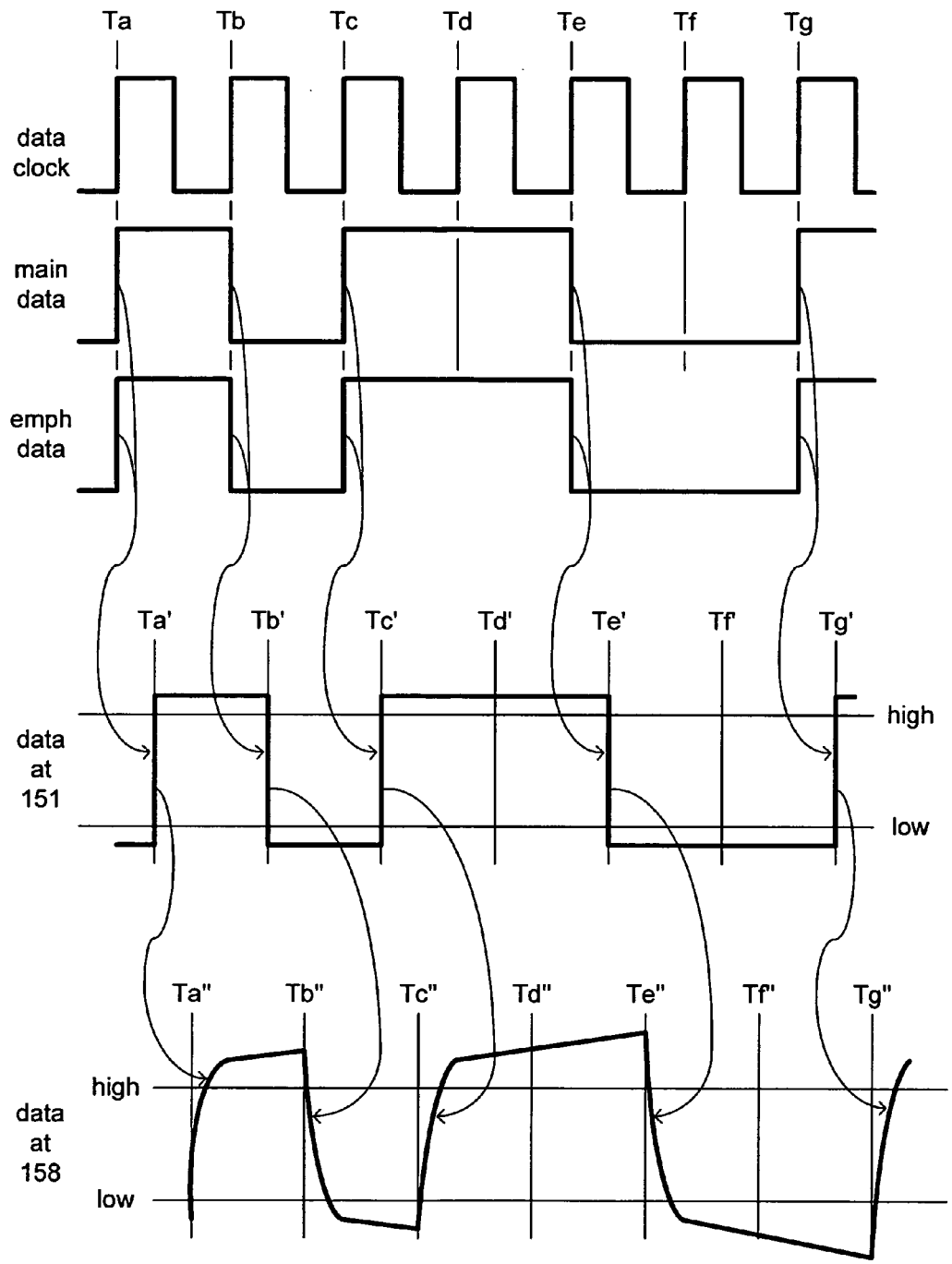

FIG. 1e depicts the results that may be seen where control logic 120 is configured to cause emphasis to be continuously employed such that emphasis could be said to be "jammed" to being continuously on. As a result, emphasis driver 144 is caused to always drive PCB trace 151 in tandem with main driver 141 such that every transition is caused to occur more quickly such that both PCB traces 151 and 158 are driven to high voltage levels that are higher than the normally desired high voltage level for receiver 165 to read a high state, and similarly, PCB traces 151 and 158 are driven to low voltage levels that are lower than the normally desired low voltage level for receiver 165 to read a low state. This continuous use of emphasis may not be deemed desirable for the normal digital transmission of high and low states, but as will be discussed in more detail, may be useful in some embodiments as an aid to detecting instances of electronic devices 110 and 160 being disconnected. Given that both main driver 141 and emphasis driver 144 are drivers with differential outputs, PCB trace 151 is usually driven to the opposite voltage level to which PCB trace 152 is driven, and therefore, one or the other of PCB traces 151 and 152 will be driven by both main driver 141 and emphasis driver 144 to a high level when continuous emphasis is employed. This continuous use of emphasis may be employed to serve a useful purpose, since the use of continuous emphasis ensures that if electronic devices 110 and 160 are disconnected from each other such that there is a signal reflection caused to occur on whichever one of conductors N or I that is being driven to a high level, the degree of the increase in voltage level on that conductor caused by the signal reflection will be caused to reach an even higher voltage, thereby making the signal reflection easier to detect and distinguish from other possible events on that conductor, thereby making the occurrence of the disconnection of electronic device 160 from electronic device 110 easier to detect with certainty at the vicinity of main driver 141 and emphasis driver 144.

Figure 2A:
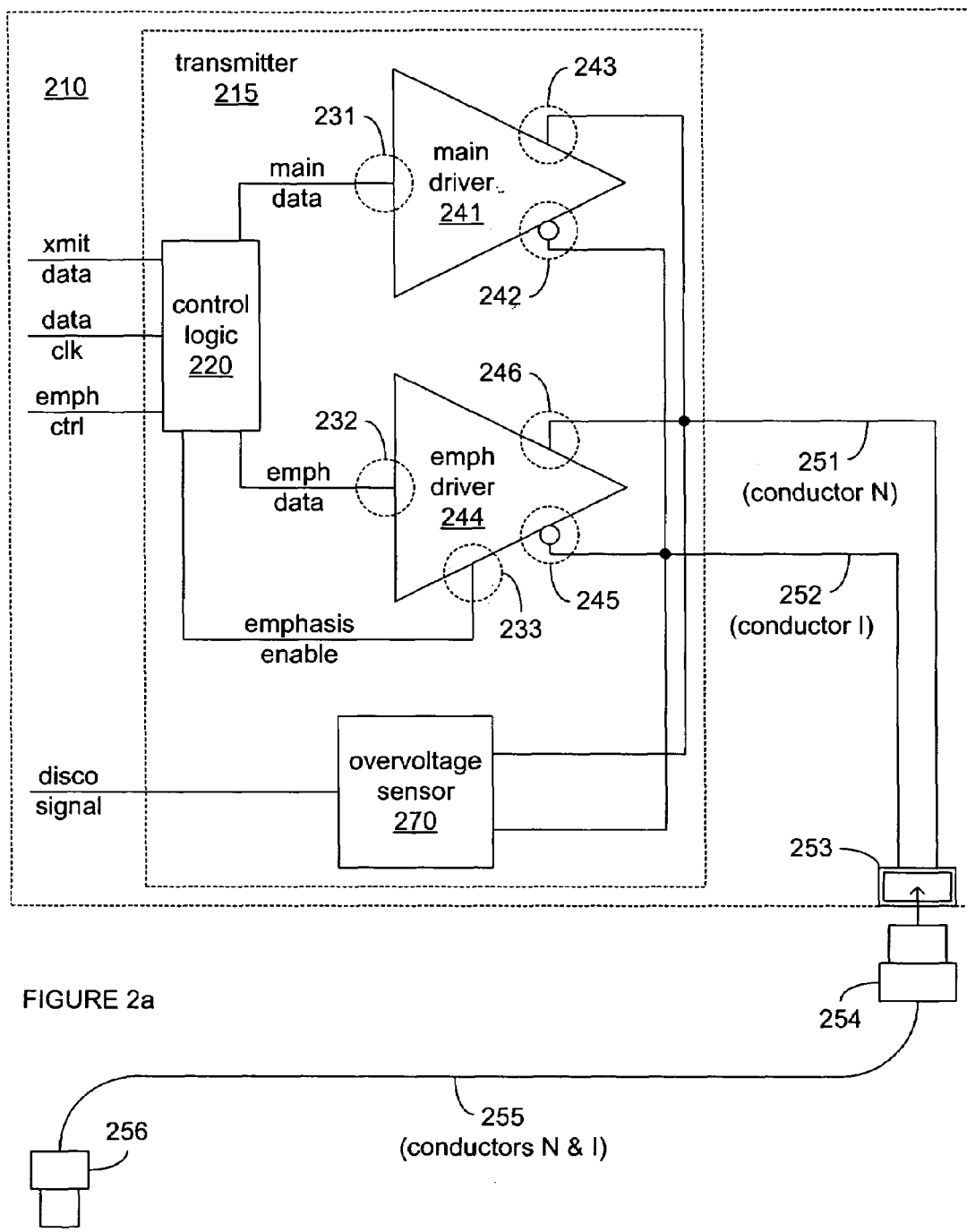
FIG. 2a is a block diagram of embodiments capable of providing timed emphasis and de-emphasis in digital signal transmissions, as well as detecting the absence of a connection to an electronic device.

FIG. 2a is a block diagram of embodiments capable of employing timed emphasis and de-emphasis in digital signal transmissions, not unlike FIG. 1a in many respects. Indeed, electronic device 210 of FIG. 2a is substantially identical to electronic device 110 of FIG. 1a, with both having main and emphasis drivers (i.e., main drivers 141 and 241, and emphasis drivers 144 and 244, respectively) and control logics (i.e., control logics 120 and 220, respectively) so as to be able to transmit a signal with emphasis, de-emphasis, or neither emphasis or de-emphasis. However, unlike electronic device 110, electronic device 210 is further made up of overvoltage sensor 270 to detect an occurrence of a high voltage level that exceeds a predetermined overvoltage level as a result of a reflection caused by the disconnection of another electronic device, not unlike what was just described with reference to FIG. 1e.

In a manner not unlike PCB traces 151 and 152 of electronic device 110 of FIG. 1a, PCB trace 251 is coupled to the non-inverting outputs of main driver 241 and emphasis driver 244, and PCB trace 251 makes up at least a portion of a conductor (also hereinafter referred to as "conductor N") that is but one of two conductors making up a differential pair of conductors. The other conductor (also hereinafter referred to as "conductor I") is at least partially made up of PCB trace 252, and PCB trace 252 is coupled to the inverting outputs of main driver 241 and emphasis driver 244. In a manner not unlike what was discussed with regard to what was depicted in FIG. 1a, conductors N and I may also be further made up of wires within a cable, such as cable 255, that are coupled to PCB traces 251 and 252, and this coupling of the wires within cable 255 and PCB traces 251 and 252 may be through cable connectors 253 and 254, such that cable 255 may be able to be disconnected from electronic device 210, thereby resulting in those wires within cable 255 no longer making up a portion of conductors N and I.

PCB traces 251 and 252 are also coupled to the inputs of overvoltage sensor 270 to detect the occurrence of a voltage level that exceeds a predetermined overvoltage voltage level. Given that PCB traces 251 and 252 are at least portions of conductors N and I that are used in differential signaling configuration, in some embodiments, overvoltage sensor 270 detects the occurrence of the exceeding of an overvoltage voltage level by comparing the voltage levels of PCB traces 251 and 252 to determine if the difference in voltage levels between them exceeds the predetermined overvoltage voltage level. As those skilled in the art will readily recognize, however, single-ended signaling may be used as an alternative to differential signaling, and therefore, overvoltage sensor 270 may have only one input coupled to a conductor used in transmitting data, and may compare the voltage level at that input to a ground or other reference voltage to detect the occurrence of a voltage level exceeding a predetermined overvoltage level.

Figure 2B:
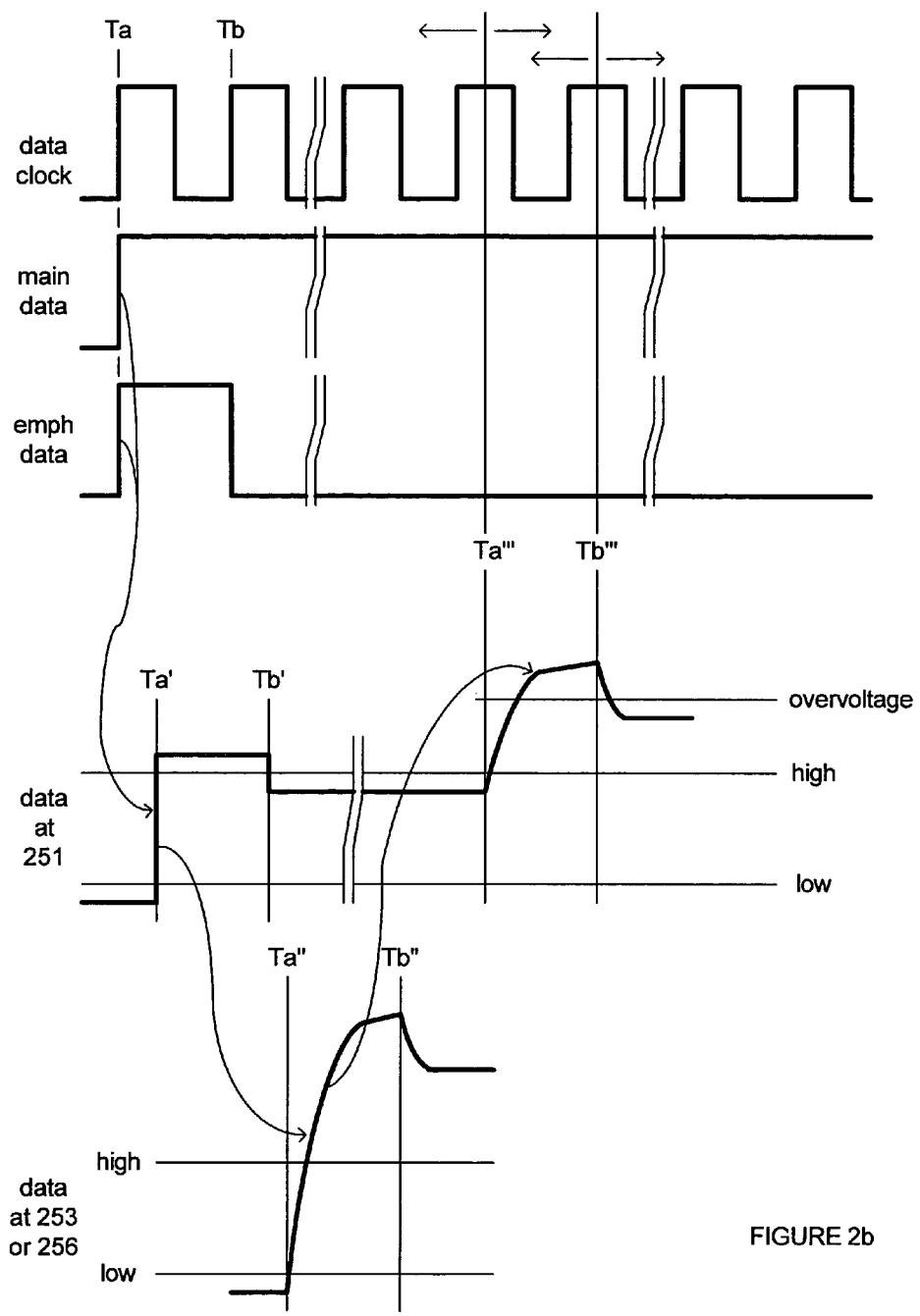
Figure 2C:
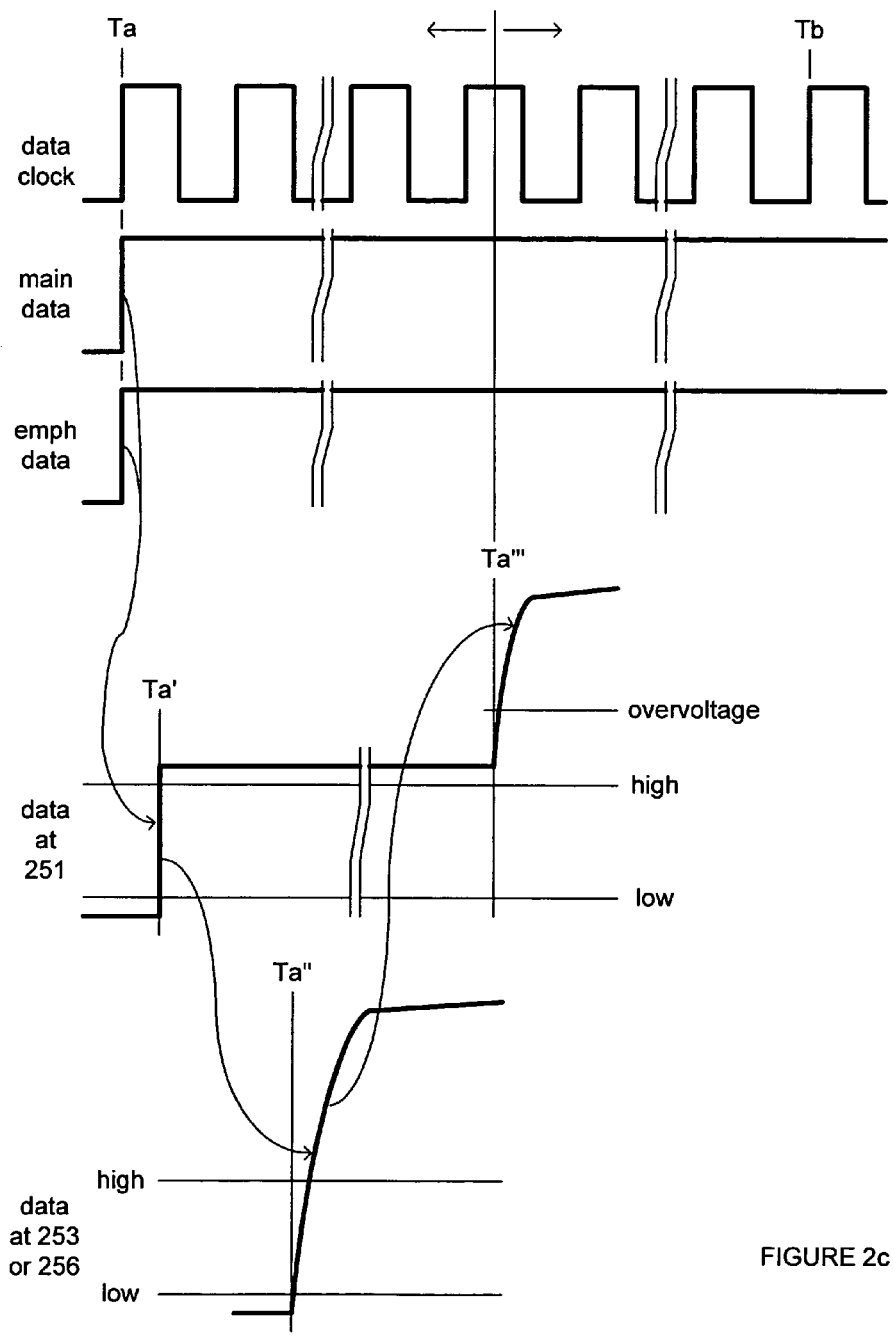

FIGS. 2b and 2c are timing diagrams of the selective use of emphasis and de-emphasis by the embodiments discussed with reference to what is depicted in FIG. 2a, each depicting the results of differing ways of using or not using emphasis and/or de-emphasis in detecting an occurrence of a disconnection of an electronic device to which electronic device 210 might otherwise have been connected. In a manner very similar to FIGS. 1b through 1e, the data clock received by control logic 220 is depicted, as well as the main data received by main driver 241 and the emphasis data received by emphasis driver 244, along with the resulting signals that may be observed on PCB trace 251 in close proximity to the outputs of main driver 241 and emphasis driver 244, and the resulting signals that may be observed on the other end of conductor N, whether that other end is at cable connector 253 (as a result of cable 255 not being connected to electronic device 210) or at cable connector 256 (as a result of cable 255 being connected to electronic device 210). It should be noted that for the sake of clarity and simplicity of discussion, signals that may be observed on conductor N coupled to the non-inverting outputs of main driver 241 and emphasis driver 244 (i.e., outputs 243 and 246) are depicted, but not signals that may be observed on conductor I coupled to their inverting outputs (i.e., outputs 242 and 245), since those signals would be largely an opposing mirror image, at least much of the time, given that main driver 241 and emphasis driver 244 are differential drivers. It should also be noted that to facilitate ease of comparison of results between differing ways in which emphasis and/or de-emphasis is employed or not employed, FIGS. 2b and 2c depict the same signals, as well as the same pattern of transitions on the main data signal at the same time points.

FIG. 2b depicts the results that may be seen where a timed combination of emphasis and de-emphasis is enabled such that control logic 210 supplements the current with which main driver 241 drives a transition with emphasis driver 244 to provide emphasis, then switching to providing de-emphasis such that emphasis driver 244 subtracts from the current with which main driver 241 continues drives a high state after a single cycle of data clock. At time point Ta, main driver 241 receives the low-to-high transition of main data at input 231. Main driver 241 re-drives this low-to-high transition onto PCB trace 251, and given that a transition has occurred in the main data signal, control logic 220 passes on the same low-to-high transition as emphasis data to input 232 of emphasis driver 244 to also re-drive onto PCB trace 251 in tandem with main driver 241, thereby adding to the strength with which this low-to-high transition is being re-driven by main driver 241 (i.e., providing "emphasis" to this low-to-high transition) such that the low-to-high transition that occurs on PCB trace 251 at time point Ta' is relatively quick and the high voltage level that is reached is above the high voltage level that would be reached if such emphasis were not provided. This speedy low-to-high transition on PCB trace 251 at time point Ta' is followed by a low-to-high transition at time point Ta" at cable connector 253 or 256 (or wherever conductor N ends in various possible embodiments) that also occurs more quickly and reaches a higher voltage level than would have occurred were emphasis not provided. The lack of connection of electronic device 210 to another electronic device results in the low-to-high transition occurring at the end of conductor N being reflected back along the length of conductor N towards the outputs of main driver 241 and emphasis driver 244, resulting in an additional low-to-high transition occurring on PCB trace 251 at time point Ta'". This additional low-to-high transition boosts the voltage level from a high voltage level to an even higher voltage level that exceeds a predetermined overvoltage level and is detected by overvoltage detector 270 (also at the vicinity of main driver 241 and emphasis driver 244) as an indication of the lack of connection of another electronic device to electronic device 210.

However, as previously mentioned, control logic 220 is to cause emphasis to occur starting on each occurrence of a transition for a duration of only one full cycle of data clock, and so, if there is not another transition at the start of the next full cycle of data clock, control logic 220 is to cause de-emphasis to occur until the next transition takes place. As a result, the emphasis provided in driving a high voltage that control logic 220 causes emphasis driver 244 to provide starting at the occurrence of the low-to-high transition at time point Ta continues only until time point Th, where control logic 220 changes the emphasis data transmitted to input 232 of emphasis driver 244 to be the opposite state of the main data received at input 231 of main driver 241, such that emphasis driver 244 now attempts to drive the opposite voltage level onto PCB trace 251 that main driver 241 is still driving (i.e., emphasis driver 244 now provides de-emphasis of the voltage level that main driver 241 is driving). Given that emphasis driver 244 drives PCB trace 251 with a strength that is a fraction of the strength with which main driver 241 drives PCB trace 251, the result of emphasis driver 244 driving an opposing voltage level to main driver 241 is a reduction in the voltage level observed on PCB trace 251 starting at time point Th', which is then followed by at least a cessation in the climbing of the voltage level at the end of conductor N at time point Th", and possibly, a slight reduction in voltage level, there. The lack of connection of electronic device 210 to another electronic device results in this slight high-to-low transition occurring at the end of conductor N being reflected back along the length of conductor N towards the outputs of main driver 241 and emphasis driver 244, resulting in a slight high-to-low transition occurring on PCB trace 251 at time point Th'". This slight high-to-low transition may lower the voltage level on PCB trace 251 to a voltage level that is below the predetermined overvoltage level.

FIG. 2c depicts the results that may be seen where control logic 220 is configured to cause emphasis to be continuously employed such that emphasis could be said to be "jammed" to being continuously on. As a result, emphasis driver 244 is caused to always drive PCB trace 251 in tandem with main driver 241 such that every transition is caused to occur more quickly such that PCB trace 251, as well as the rest of conductor N, is driven to a high voltage level that is higher than may normally be desired during the transmission of data from electronic device 210 to another electronic device. Not unlike what was described with regard to FIG. 2b, at time point Ta, main driver 241 receives the low-to-high transition of main data at input 231. Main driver 241 re-drives this low-to-high transition onto PCB trace 251, and given that a transition has occurred in the main data signal, control logic 220 passes on the same low-to-high transition as emphasis data to input 232 of emphasis driver 244 to also re-drive onto PCB trace 251 in tandem with main driver 241, thereby providing emphasis such that the low-to-high transition that occurs on PCB trace 251 at time point Ta' is relatively quick and the high voltage level that is reached is above the high voltage level that would be reached if such emphasis were not provided. This speedy low-to-high transition on PCB trace 251 at time point Ta' is followed by a low-to-high transition at time point Ta" at cable connector 253 or 256 (or wherever conductor N ends in various possible embodiments) that is also quicker and reaches a higher voltage level than would have occurred were emphasis not provided. The lack of connection of electronic device 210 to another electronic device results in the low-to-high transition occurring at the end of conductor N being reflected back along the length of conductor N towards the outputs of main driver 241 and emphasis driver 244, resulting in an additional low-to-high transition occurring on PCB trace 251 at time point Ta''', and the resulting voltage level that exceeds the predetermined overvoltage level is detected by overvoltage detector 270 as an indication of the lack of connection of another electronic device to electronic device 210. Without a subsequent high-to-low transition being driven by main driver 241, the provision of de-emphasis by driver 244, or the connection of another electronic device to electronic device 210 through conductor N, the voltage level throughout conductor N may continue to rise somewhat further. Such a use of "jammed" or continuous emphasis for a number of clock cycles (e.g., 20 clock cycles) may be employed as a way to ensure accuracy of detection of the lack of another electronic device being connected to electronic device 210 through conductor N where it is possible that the total length of conductor N may be such that a considerable number of clock cycles is needed to ensure that there will be sufficient time for a reflection of a signal from the end of signal conductor N to be received by overvoltage detector 270.

Some embodiments may combine the use of timings similar to what is depicted in FIGS. 1b-e, as well as the use of timings similar to what is depicted in FIGS. 2b-c. In such embodiments, a combination of emphasis and de-emphasis may be employed during the transmission of data such that emphasis is employed starting upon the occurrence of a transition between high and low states, followed by the possible employment of de-emphasis to minimize the occurrence of excessively high or low states during data transmission within a relatively short period of time after the occurrence of the transition between high and low states. In the same such embodiments, emphasis alone may be used upon the occurrence of a transition from a low to a high state in which both the high state and the emphasis is maintained for a relative lengthy period of time that is chosen to be long enough to ensure that any reflection from the low-to-high transmission from the end of conductor N will be received by overvoltage detector 270. In embodiments where a clock signal is used to determine the duration of the short and lengthy periods of time, and as previously discussed, such a relatively short period of time may be a fraction of a clock cycle or a full clock cycle, and as previously discussed, such a relatively lengthy period of time may be of multiple clock cycles in length.

Figure 3:
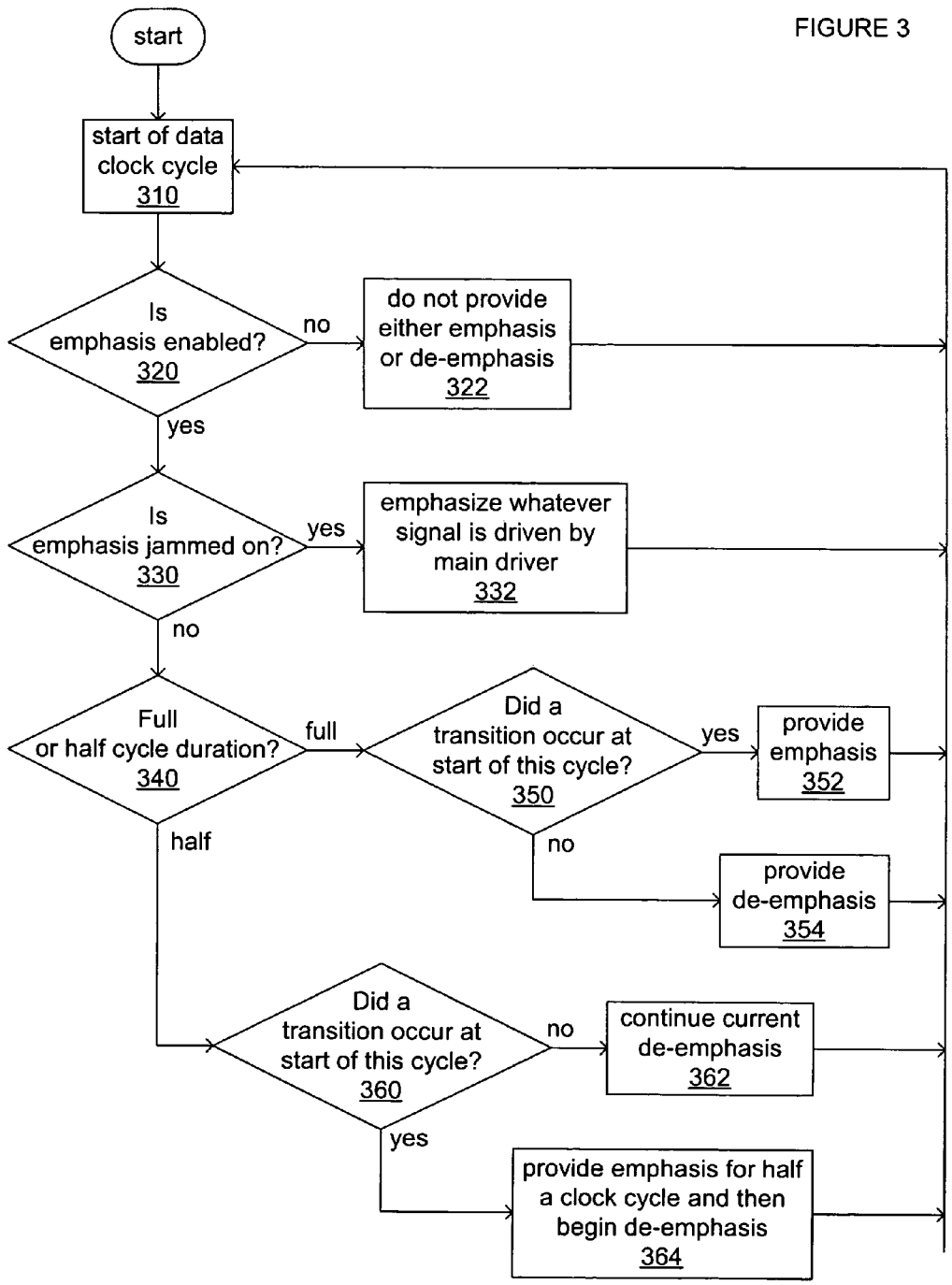
FIG. 3 is a flow chart of embodiments in which emphasis and/or de-emphasis is used or not used.

FIG. 3 is a flowchart of embodiments in which emphasis and/or de-emphasis is used or not used. A cycle of a data clock used to time the provision of data to a transmitter begins at 310. If emphasis is not enabled at 320, then no form of emphasis or de-emphasis is provided at 322. However, if emphasis is enabled at 320, and emphasis has been jammed on (i.e., configured so that emphasis is continuously provided at 330, then whatever high or low signal is being driven by the main driver of the transmitter is given emphasis such that the signal being driven by the main driver is augmented to increase its strength.

If emphasis is enabled at 320, is not jammed on at 330 and is configured to be timed on a full cycle of the data clock at 340, then emphasis is provided at 352 if the main driver is re-driving a signal reflecting the fact that a transition is found to have taken place in the data provided to the transmitter at the start of the current clock cycle at 350. Otherwise, if no such transition is found to have occurred at the start of the current clock cycle at 350, then de-emphasis is provided to reduce the strength of the signal driven by the main driver at 354.

If emphasis is enabled at 320, is not jammed on at 330 and is configured to be timed on a half cycle of the data clock at 340, then a current provision of de-emphasis is continued at 362 if no transition is found to have occurred coincident with the start of the current cycle of the data clock at 360. Otherwise, if a transition is found to have occurred coincident with the start of the current clock cycle of the data clock at 360, then at 364, emphasis is provided to the transition being re-driven by the main driver for the duration of the first half of the current cycle of the data clock, followed by the start of de-emphasis.

Although FIG. 3 depicts only half and full cycle timings as available choices, as has been previously discussed, and as those skilled in the art will readily recognize, a partial cycle timing other than half a cycle (e.g., a third, or a fourth of a cycle, or some other fractional amount of a cycle) may be employed. Furthermore, although FIG. 3 depicts possible timings by which emphasis and/or de-emphasis may be provided for only a single emphasis driver accompanying a main driver, as has been previously discussed, more than one emphasis driver may be employed in which each of those multiple emphasis drivers may provide emphasis and/or de-emphasis with differing drive strengths, and/or differing timings such that the times at which one emphasis driver commences providing emphasis and/or de-emphasis in the course of transmitting a piece of data may differ relative to another emphasis driver.

Figure 4A:
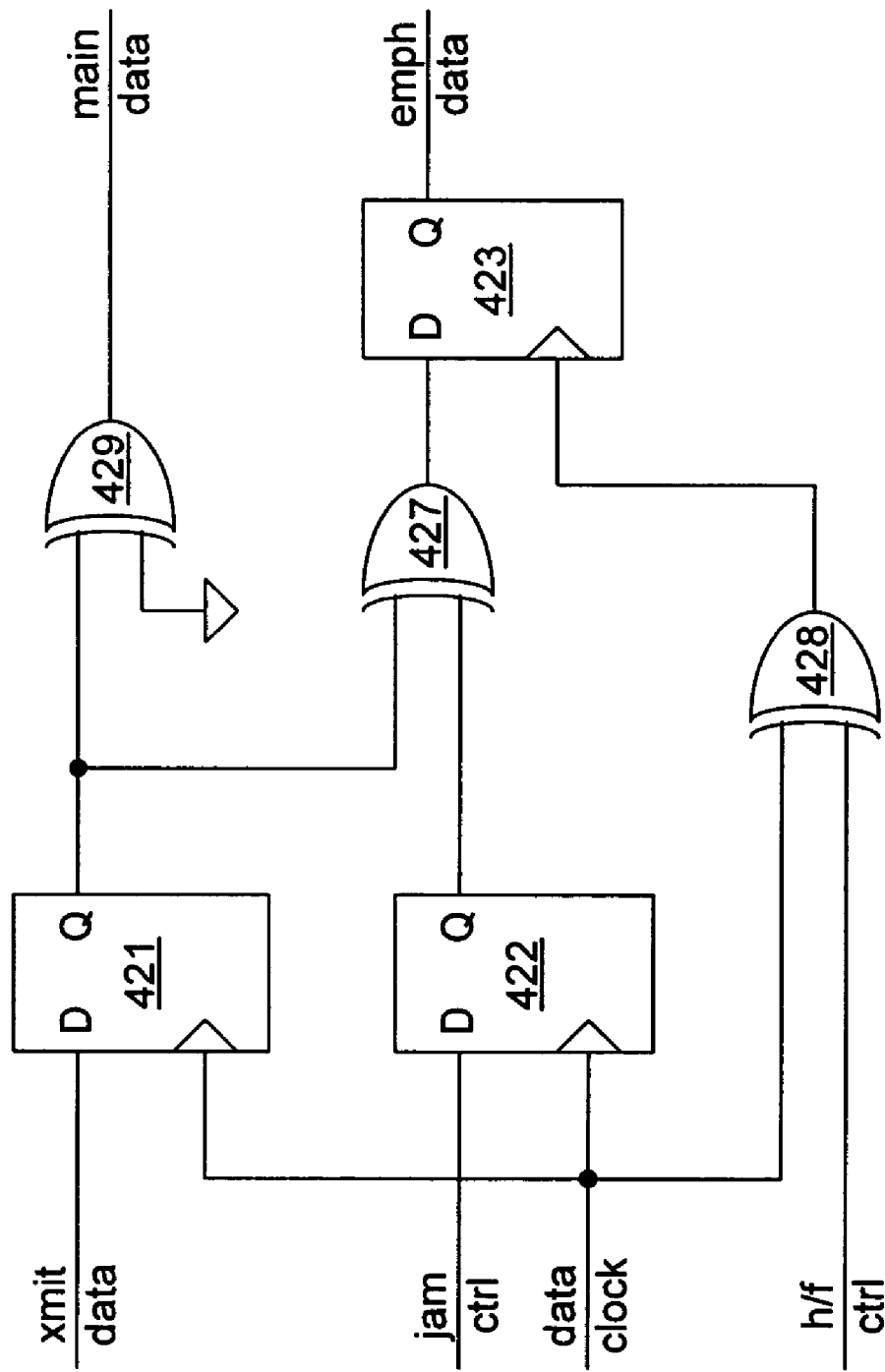
FIGS. 4a, 4b and 4c are schematics of portions of embodiments of transmitters selectively employing emphasis and/or de-emphasis.
Figure 4B:
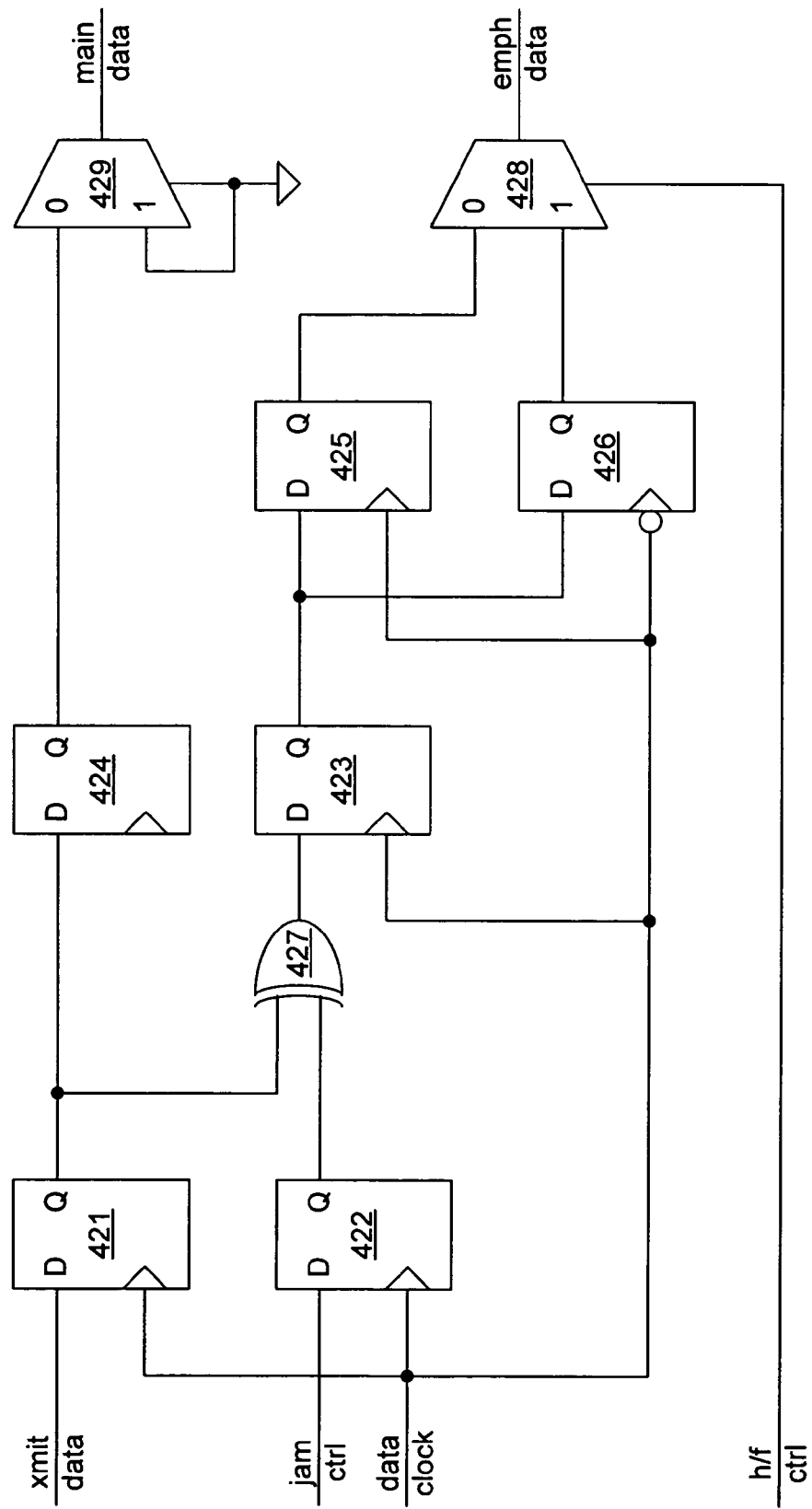
Figure 4C:
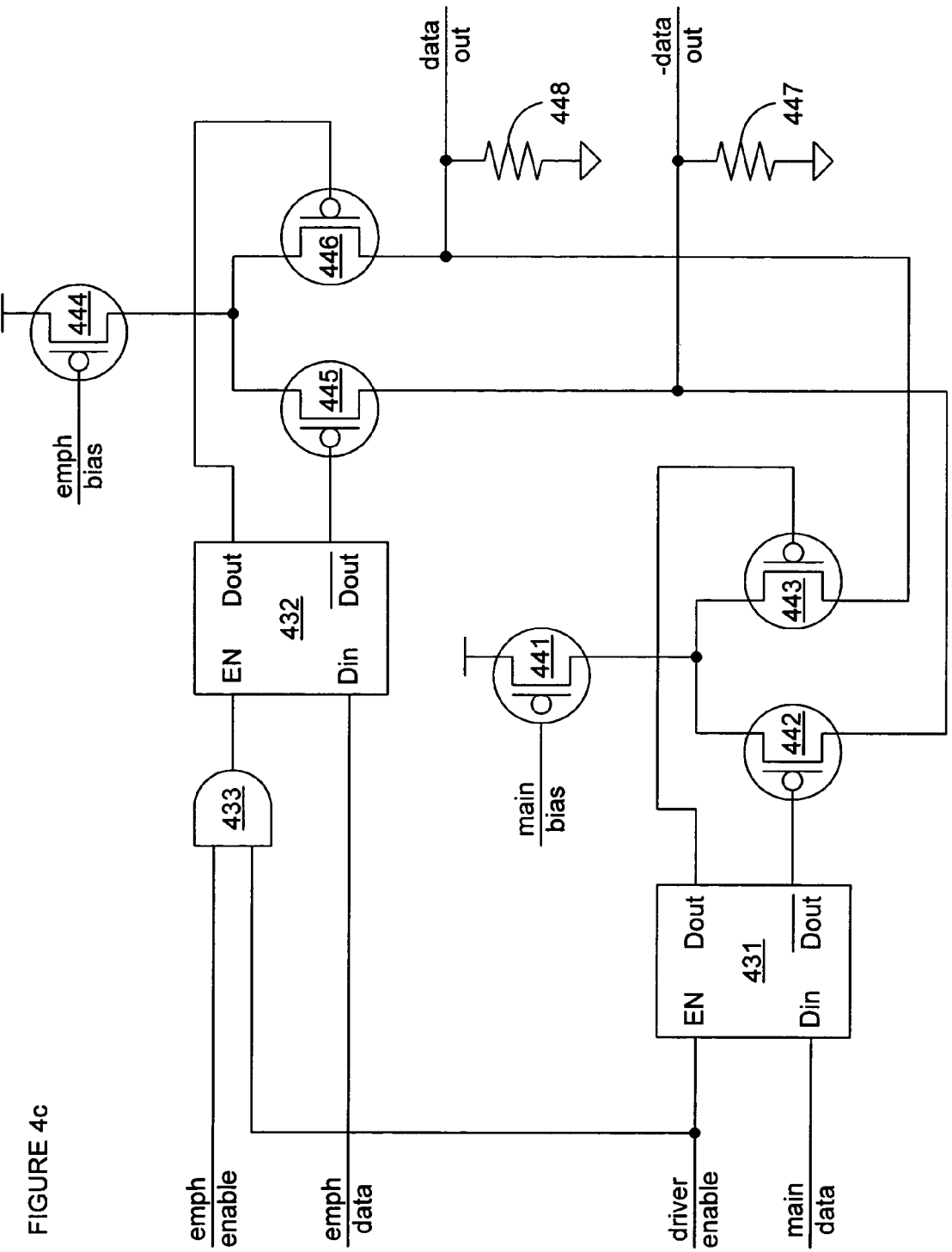

FIGS. 4a, 4b and 4c are schematics of portions of embodiments of transmitters selectively employing emphasis and/or de-emphasis. Together, the portions depicted in FIGS. 4a and 4c make up one possible embodiment of a transmitter, and together, the portions depicted in FIGS. 4b and 4c make up another possible embodiment of a transmitter.

Turning to the embodiment made up of what is depicted in FIGS. 4a and 4c, data to be transmitted is received at the data input of flip-flop 421 and is relayed as an input to both XOR 427 and XOR 429 as timed by the a clock received at the clock input of flip-flop 421. A jam control signal to enable or disable the continuous use of emphasis to augment the strength of the signal that is transmitted is received at the data input of flip-flop 422 and is relayed as the other input to XOR 427 also as timed by the data clock received at the clock input of flip-flop 422. The half/full cycle control signal that enables a selection to be made between emphasis being driven for a period of only half a cycle of data clock or for a full cycle of data clock is received as an input to XOR 428, along with the data clock, itself. The output of XOR 427 is relayed to the data input of flip-flop 423, and the output of XOR 428 is relayed to the clock input of flip-flop 423. With these two inputs, flip-flop 423 generates the emphasis data signal that is provided to pre-driver 432 to generate both inverted and non-inverted forms of emphasis data to be passed on to the gate inputs of PMOS switches 445 and 446, respectively, for transmission onto a differential pair of signal lines that are coupled to the drains of PMOS switches 445 and 446, and terminated to ground via resistors 447 and 448, respectively. XOR 429 is employed to delay the timing of the output of flip-flop 421 to create a main data signal that is timed to match the emphasis data signal, and is provided to pre-driver 431 to generate both inverted and non-inverted forms of main data to be passed on to the gate inputs of PMOS switches 442 and 443, respectively, for transmission onto the same pair of differential pair of signal lines coupled to the drains of PMOS switches 445 and 446 through their connections to the drains of PMOS switches 442 and 443. A driver enable signal is provided to both the enable input of pre-driver 431 and AND gate 433, which receives a separate emphasis driver enable signal as its other input, and which provides its output to the enable input of pre-driver 432. PMOS switch 441 serves as a component of a current source coupled to the sources of PMOS switches 442 and 443, and PMOS switch 444 serves as a component of a current source coupled to the sources of PMOS switches 445 and 446, under the control of a main bias input and an emphasis bias input coupled to the gates of PMOS switches 441 and 444, respectively, to providing a way to control the relative drive strengths with which the main and emphasis data signals are re-driven on to the differential pair of signal lines, and allowing the strength with which emphasis and de-emphasis is provided to be set to be a fraction of the strength with which data is actually transmitted.

Turning to the embodiment made up of what is depicted in FIGS. 4b and 4c, data to be transmitted is received at the data input of flip-flop 421 and is relayed as an input to both XOR 427 and flip-flop 424 as timed by a data clock received at the clock input of flip-flop 421. A jam control signal to enable or disable the continuous use of emphasis to augment the strength of the signal that is transmitted is received at the data input of flip-flop 422 and is relayed as the other input to XOR 427 also as timed by the data clock received at the clock input of flip-flop 422. The output of XOR 427 is relayed to the data input of flip-flop 423 which also receives the data clock at its clock input. The output of flip-flop 423 is relayed to the data inputs of both flip-flops 425 and 426, with flip-flop 425 receiving the data clock at its clock input and flip-flop 426 receiving the data clock through an inverted clock input, such that flip-flops 425 and 426 are clocked out of phase of each other. Flip flops 425 and 426 generate two forms of emphasis data, one timed to cause a change from emphasis to de-emphasis after a full cycle of data clock has passed since a data transition, and the other timed to cause a change from emphasis to de-emphasis after only half a cycle of the data clock after a data transition. These two forms of emphasis data are presented as alternative inputs to multiplexer 428 which receives a half/full cycle control signal at its selector input to select between these two forms of emphasis data to be provided to pre-driver 432 to be ultimately driven onto a differential pair of signal lines as was described with reference to the combination of portions depicted in FIGS. 4a and 4c. Flip-flop 424 and multiplexer 429 are employed to delay the timing of the output of flip-flop 421 to create a main data signal that is timed to match the emphasis data signal, and is provided to pre-driver 431 to be ultimately driven onto the same differential pair of signal lines as was described with reference to the combination of portions depicted in FIGS. 4b and 4c.

The combination of portions depicted in FIGS. 4b and 4c may be implemented with various possible alterations and/or expanded in various ways to support other fractional portions of clock cycles so as to offer other timing relationships between the start of emphasis and the start of de-emphasis than either a half clock cycle or a full clock cycle. Additionally, various possible alterations or expansions in which portions of what is depicted may be duplicated so as to support having multiple degrees or levels of drive strength for providing emphasis and/or de-emphasis, perhaps with multiple changes, perhaps with those changes occurring at staged time intervals.

In both the embodiment made up of the combination of portions depicted in FIGS. 4a and 4c and in the embodiment made up of the combination of portions depicted in FIGS. 4b and 4c, various control signals have been provided (as described) that allow emphasis and/or de-emphasis to be selectively used in ways that could generate the some or all of the kinds of results depicted in the timing diagrams of FIGS. 1b-1e described, earlier. The jam control signal could be employed (as earlier discussed) to cause emphasis to be continuously applied, and this could generate the results depicted for PCB traces 151 and 158 in FIG. 1e, in which each high and low driven by a main driver (such as the combination of PMOS switches 441, 442 and 443) is augmented with emphasis provided by an emphasis driver (such as the combination of PMOS switches 444, 445 and 446) such that the result high voltage levels observed both adjacent to and at the other end of a cable from the main and emphasis drivers would be transitioned to more quickly and would reach high and low voltages levels that would be higher and lower than needed to allow a receiver to distinguish between high and low states. The half/full cycle control signal could be employed (as earlier discussed) to cause emphasis used to augment the signal driven by a main driver from the beginning of a data transition to end and be replaced by de-emphasis either after a full cycle of a data clock as was depicted in the timing diagrams of FIG. 1b, or after only half a cycle of a data clock as was depicted in the timing diagrams of FIG. 1c. Finally, the emphasis enable control signal could be employed to disable all use of emphasis and de-emphasis, resulting in signals observed on signal lines both adjacent to and at the other end of a cable from the main and emphasis drivers that would resemble what was depicted in the timing diagrams of FIG. 1a.

The invention has been described in conjunction with various possible embodiments. It is evident that numerous alternatives, modifications, variations and uses will be apparent to those skilled in the art in light of the foregoing description. It will be understood by those skilled in the art that the present invention may be practiced in support of various types of electronic devices employing conductors and driver circuits for purposes other than transmission of signals between electronic devices coupled by a cable. It will also be understood by those skilled in the art that the present invention may be practiced in support of electronic devices other than computer systems and peripherals related to computer systems, such as audio/video entertainment devices, controller devices in vehicles, appliances controlled by electronic circuitry, etc.

What is claimed is:

1. An apparatus comprising:
   a conductor having first and second ends;
   a main transmitter coupled to the first end of the conductor to transmit a data signal comprised of a transition between high and low states and a test signal comprised of a low-to-high transition;
   an emphasis transmitter coupled to the first end of the conductor to provide emphasis starting at the time of the transition between states of the data signal and throughout a shorter predetermined time period, and to provide emphasis starting at the time of the low-to-high transition of the test signal and throughout a longer predetermined time period, wherein emphasis is provided with a lesser drive strength than the data and test signals; and an overvoltage detector coupled to the first end of the conductor to detect an occurrence of a voltage level that exceeds a predetermined overvoltage level while the main transmitter transmits a high voltage level and the emphasis transmitter provides emphasis.

2. The apparatus of claim 1, wherein the conductor is comprised of a PCB trace within the electronic device.

3. The apparatus of claim 2, wherein the main transmitter, the emphasis transmitter and the overvoltage detector are within a single semiconductor device and are coupled to the first end of the conductor through a single pin of the package of the semiconductor device.

4. The apparatus of claim 1, wherein the conductor is comprised of at least one wire of a cable.

5. The apparatus of claim 1, wherein both the main transmitter and the emphasis transmitter are differential transmitters.

6. The apparatus of claim 1, wherein the shorter predetermined time period is a fraction of a clock cycle of a clock employed in timing the transmission of the data signal.

7. The apparatus of claim 1, wherein the shorter predetermined time period is a whole clock cycle of a clock employed in timing the transmission of the data signal.

8. The apparatus of claim 1, wherein the longer predetermined time period is multiple clock cycles of a clock employed in timing the transmission of the data signal.

9. The apparatus of claim 1, wherein the emphasis transmitter ceases providing emphasis at the end of the shorter predetermined period of time and switches to providing de-emphasis.

10. The apparatus of claim 9, further comprising a control logic having a jam input to cause the emphasis transmitter to cease providing de-emphasis at the end of the shorter predetermined period of time, and to continuously provide emphasis.

11. A method comprising:
driving a transition between high and low states onto the first end of a conductor having both first and second ends to transmit a piece of data;
providing emphasis starting at the time the transition is driven onto the first end of the conductor and throughout a shorter predetermined period of time;
driving a low-to-high transition onto the first end of the conductor to test for the absence of an electronic device coupled to the second end of the conductor;
providing emphasis starting at the time of the low-to-high transition is driven onto the first end of the conductor and through a longer predetermined period of time that is longer than the shorter predetermined period of time; and
waiting for the receipt at the first end of the conductor of a transition in voltage levels from a high voltage level to a higher voltage level that exceeds a predetermined overvoltage voltage level caused by a reflection from the second end of the conductor of the low-to-high transition driven onto the first end indicating the absence of an electronic device coupled to the second end of the conductor.

12. The method of claim 11 further comprising timing the transmission of the piece of data and the low-to-high transition to a clock signal.

13. The method of claim 12, wherein the shorter predetermined time period is a fraction of a clock cycle of the clock signal.

14. The method of claim 12, wherein the shorter predetermined time period is a whole clock cycle of the clock signal.

15. The method of claim 12, wherein the longer predetermined time period is multiple clock cycles of the clock signal.

16. The method of claim 11, further comprising:
ceasing to provide emphasis at the end of the shorter predetermined period of time; and
providing de-emphasis at the end of the shorter predetermined period of time.

17. The method of claim 16, further comprising:
receiving a jam signal from the source of the piece of data;
ceasing to provide de-emphasis at the end of the shorter predetermined period of time, and continuously providing emphasis in response to receiving the jam signal.

18. A computer system comprising:
a processor;
memory storing a piece of data;
a conductor having first and second ends;
a main transmitter coupled to the first end of the conductor to transmit a data signal transmitting the piece of data comprised of a transition between high and low states and a test signal comprised of a low-to-high transition;
an emphasis transmitter coupled to the first end of the conductor to provide emphasis starting at the time of the transition between states of the data signal and throughout a shorter predetermined time period, and to provide emphasis starting at the time of the low-to-high transition of the test signal and throughout a longer predetermined time period, wherein emphasis is provided with a lesser drive strength than the data and test signals; and
an overvoltage detector coupled to the first end of the conductor to detect an occurrence of a voltage level that exceeds a predetermined overvoltage level while the main transmitter transmits a high voltage level and the emphasis transmitter provides emphasis.

19. The computer system of claim 18, wherein the conductor is comprised of a PCB trace within the electronic device.

20. The apparatus of claim 19, wherein the main transmitter, the emphasis transmitter and the overvoltage detector are within a single semiconductor device coupled to the processor and coupled to the first end of the conductor through a single pin of the package of the semiconductor device.

* * * * *